United States Patent [19]

Provendier

[11] 4,065,641

[45] Dec. 27, 1977

[54] HIGH CAPACITY TIME CONNECTION NETWORKS

[75] Inventor: Jacques Henri Provendier, Lannion, France

[73] Assignee: Societe Anonyme de Telecommunications, Paris, France

[21] Appl. No.: 671,826

[22] Filed: Mar. 30, 1976

[30] Foreign Application Priority Data

Apr. 18, 1975 France ............................ 75.12180

[51] Int. Cl.² .......................................... H04J 3/00
[52] U.S. Cl. .......................................... 179/15 AT
[58] Field of Search ................... 179/15 AT, 15 AQ

[56] References Cited

U.S. PATENT DOCUMENTS

| | | | |
|---|---|---|---|
| 3,890,469 | 6/1975 | Kelly et al. ............... | 179/15 AT |
| 3,927,267 | 12/1975 | Voyer et al. ............... | 179/15 AT |
| 3,963,870 | 6/1976 | Couder et al. .............. | 179/15 AT |

*Primary Examiner*—Thomas W. Brown
*Attorney, Agent, or Firm*—Holman & Stern

[57] ABSTRACT

A time connection network of the kind comprising $p$ switching units having each an input buffer store and an output buffer store, and a space stage to transmit digital information in form of words or groups of $n$ binary digits from one input buffer store toward one output buffer store at a rate of one word per digit time slot. The information signals, read in an input buffer store, are conveyed serially through the space stage together with a clock signal at the rate of the serial transmission and a rectangular signal having a period preferably of two words. The information and clock signals are then distributed in two paths by means of the rectangular signal. The information signals are de-serialized on each path and then multiplexed to an output buffer store.

1 Claim, 4 Drawing Figures

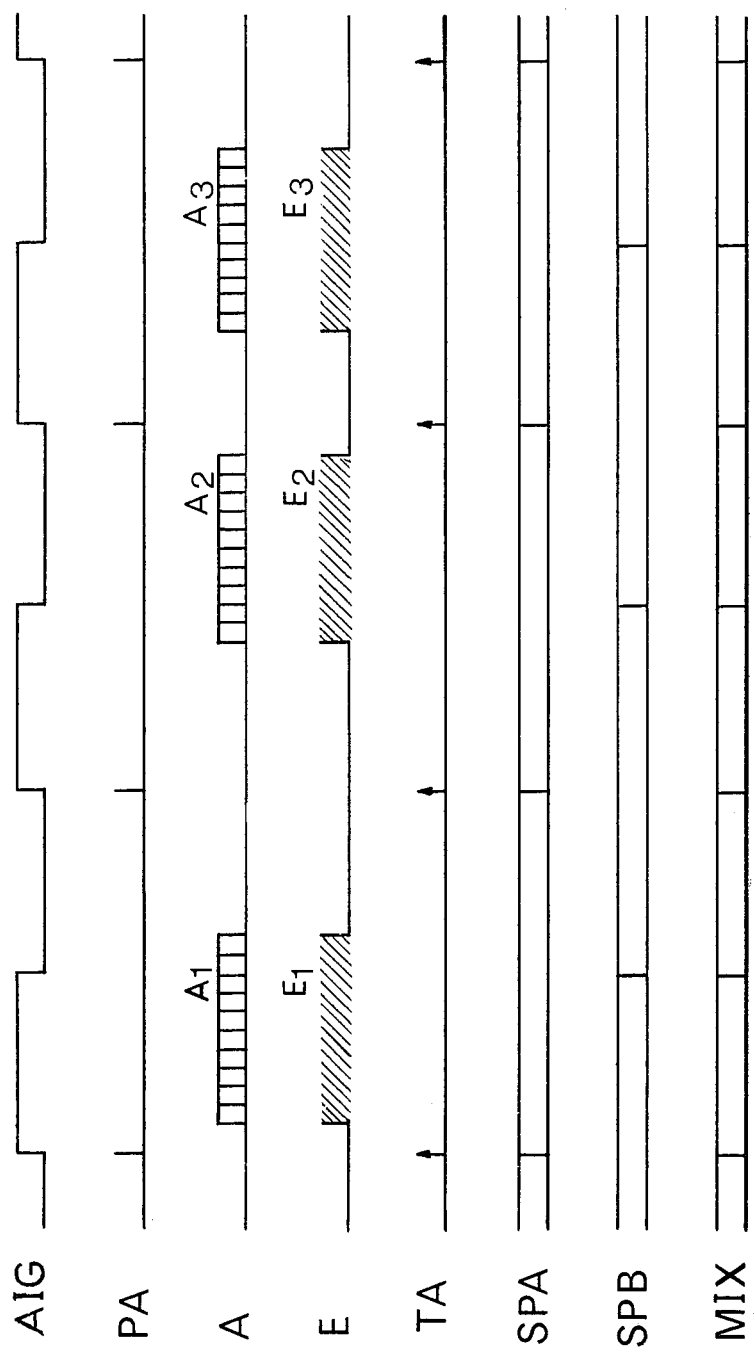
- fig.4 -

HIGH CAPACITY TIME CONNECTION NETWORKS

The present invention is related to TST (time space time) connection networks.

Connection networks of this type comprise an input time stage, a space stage and an output time stage. The input and output time stages comprise $p$ input buffer stores MTE and $p$ output buffer stores MTS, respectively, and a read control store MCL and a write control store MCE are associated with each pair of a MTE and a MTS of a same rank, one MTE-MTS pair and the MCE and MCL associated therewith substantially forming a switching unit EMC.

The time portion of the network, comprising the input and output stages, thus comprises $p$ switching units EMC each disposed at the input and at the output of the space stage. Each switching unit EMC is capable of processing for instance the PCM digital signals relative to 240 channels, i.e. eight digital pulse streams conveying each the data relative to 30 channels. The PCM digital signal, TN1, is arranged in frames of 125 μs comprising each 32 time slots of eight binary digits, the digit rate of this information is therefore 2.048 Mbits/sec.

The operation of such a connection network takes place in two phases for each time slot corresponding to the duration of one digit. During the first or external access phase a word (eight binary digits) is written in the input buffer store MTE and a word is read in the output buffer store MTS, and during the second or internal exchange phase a word is read in the MTE and a word is written in the MTS.

The function of the space stage is to ensure the distribution between the input buffer stores MTE and the output buffer stores MTS, and to transmit one word per time slot.

A parallel transmission would be particularly satisfactory in view of the relatively low digit rate used, but it would require a great number of transmission pairs. This drawback is critical in high capacity connection networks because of the great number of switching units required.

The choice of a series transmission economizes on the number of lines necessary, but leads to a much higher transmission rate. Therefore the propagation times in the spatial portion of the network acquire increased importance. A spatial distribution involving transmission lines of for example 30 meters long requires an operating margin of about 150 ns, to which must be added the various propagation time dispersions within the units. Thus, the information propagation speed is estimated at about 0.2 m/ns for a transmission on a twisted pair of impedance 150 Ω.

The object of the invention is to provide a connection network of the kind described wherein transmission of the words contained in the input buffer stores MTE toward the output buffer stores MTS is compatible on the one hand with the great number of switching units required, and on the other hand with the dispersion of the propagation times during distribution, i.e. allows propagation delays compatible with the transmission time of one word.

To this purpose, the connection network according to the invention comprises means for serially transmitting the information signals read in an input buffer store, means for transmitting a clock signal at the rate of said series transmission, means for generating a rectangular signal having a period of $m$ words, preferably of two words, means for distributing information signals and clock signals in two paths A and B, one path corresponding to the leading edge of the rectangular signal and the other path to the trailing edge of the same signal, means for serial-to-parallel converting the information signals controlled by said clock signals, means for re-phasing the transmitted signals, controlled by said rectangular signal, serial-to-parallel conversion and re-phasing being carried out in each path, and means for multiplexing signals from paths A and B and transmitting them to an output buffer store.

In the connection network of the invention, each word is received within a reception range of duration equal to that of $m$ words, preferably of two words, and synchronized within said range by means of a signal having a period equal to said duration.

The connection network of the invention provides for an operating margin which at least corresponds, for each emitted word, to the transmission time of a word. It makes it possible to economize on the number of transmission lines whilst preserving a unitary information available during a time which is at least equivalent to that available in the case of parallel transmission.

The invention will be better understood from the following description of one embodiment, referring to the attached drawing, wherein:

FIG. 4 is a time chart relative to reception in the spatial portion of the connection network.

Figure 1:
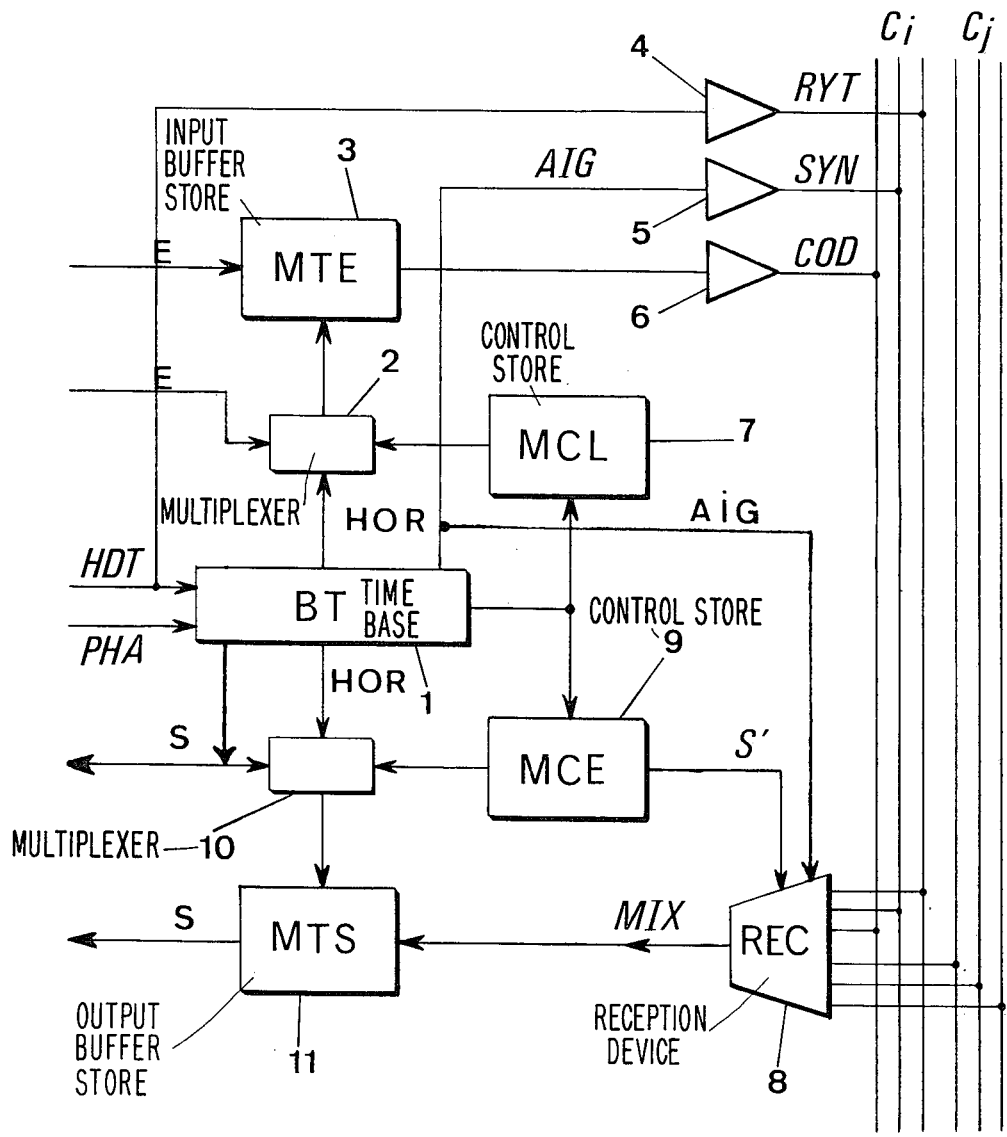
FIG. 1 is a block diagram of the connection network according to the invention, of which one single switching unit EMC is shown.

The connection network comprises in its time portion $p$ switching units EMC of which one is shown in FIG. 1. Each switching unit comprises substantially an input buffer store MTE 3, an output buffer store MTS 11, a read control store MCL 7 and a write control store MCE 9. In the described embodiment, each EMC is capable of processing 8 pulse streams comprising each 30 PCM digital channels.

The operation of a connection network according to the invention takes place in two phases for each time unit. During the phase UT$a$ or external access phase, one word is written in the input buffer store MTE 3, and one word is read in the output buffer store MTS 11. The write address in MTE 3 and the read address in MTS 11 are supplied by the rank or position of a connection TN1 among the eight connections to the EMC and by the rank or position of a word within the frame in question. The read order of MTS 11 is supplied by time base BT 1 in the switching unit EMC. During the phase UT$b$ or internal exchange phase, one word is read in each input buffer store MTE 3 and one word is written in each output buffer store MTS 11. Each MTE addresses the word read to every MTS and each MTS, controlled by the order contained in the write control store MCE, selects one word. This word is written in the output buffer stores MTS 11.

All the local time bases BT belonging to the respective switching units are synchronised by signals HDT and PHA from the master clock (not shown) of the connection network. Signal HDT is a clock signal having a frequency of 20.480 MHz which determines the digit rate within the EMC, and signal PHA is a clock signal having a frequency of 8 kHz which determines the recurrence frequency of the PCM frame.

The time bases BT 1 control the reading and writing devices 2 and 10 respectively, of the input buffer stores MTE 3 and the output buffer stores MTS 11 by means of a clock signal HOR having a frequency of 2.048 MHz. Devices 2 and 10 are multiplexers receiving the input (resp. output) addresses and the reading (resp. writing) orders from control stores MCL (resp. MCE).

In the described embodiment, eight binary digits of the speech sample are associated with two binary digits of the signalling samples on each channel. The rate is therefore one 10-digit word per time slot, i.e. the digit rate is 20.480 Mbits/sec.

Figure 2:
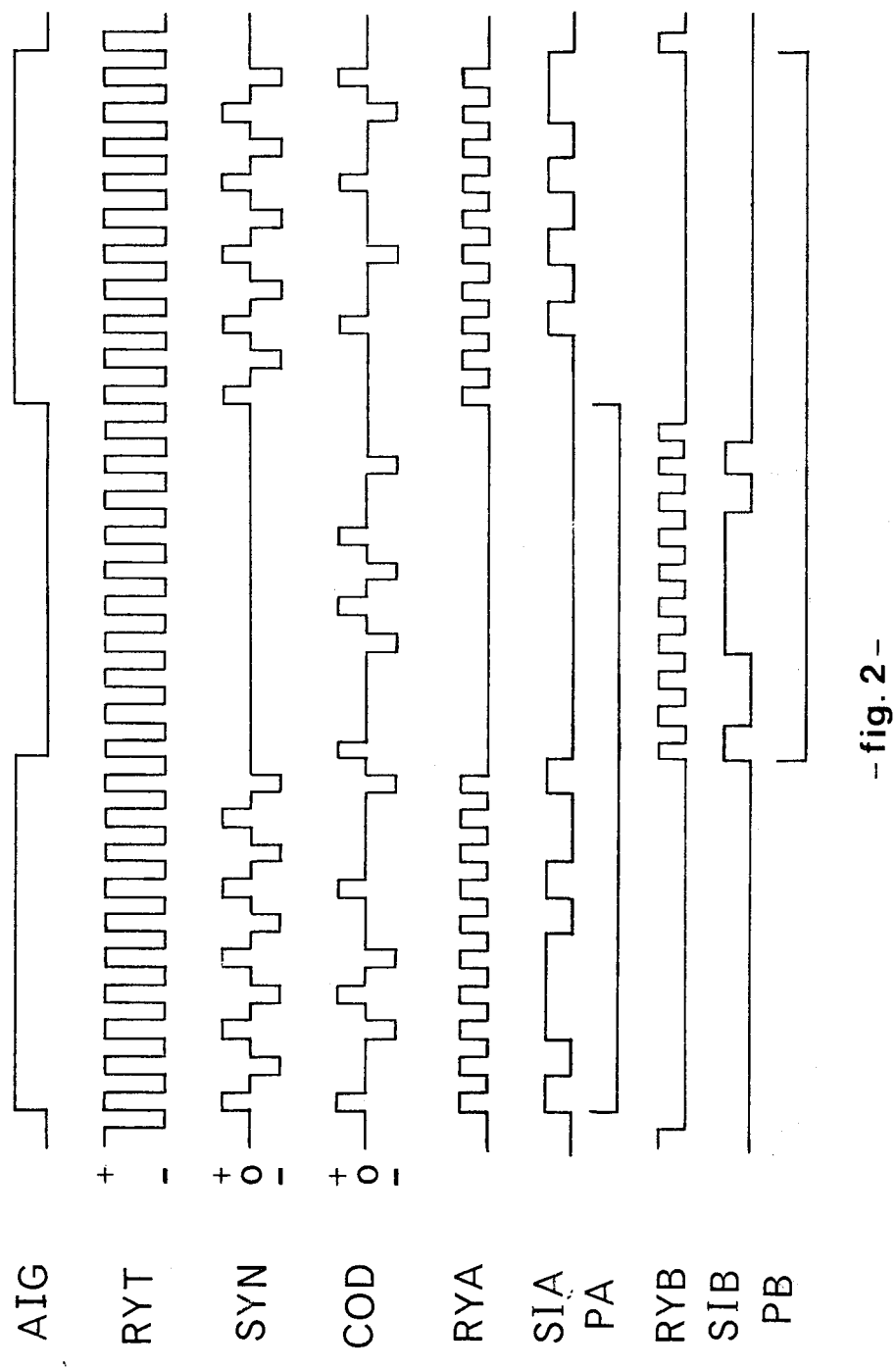
FIG. 2 shows the signals exchanged by the switching units EMC on transmission and reception.

The input words are written in MTE 3 in parallel and read in parallel, then serialized at the output of MTE 3 in a parallel-to-serial converter (not shown). They are passed in an amplifier 6 comprising a shaping circuit for converting binary signals into bipolar signals. Amplifier 6 delivers a bipolar signal COD, as shown in FIG. 2. Though it is not shown, amplifier 6 is supplied with signal HDT having a frequency of 20.480 MHz, which is necessary for binary-to-bipolar conversion. This conversion is necessary to ensure galvanically isolated transmission.

Time base BT 1 further delivers a rectangular signal AIG shown in FIG. 2, having a frequency of 1.024 MHz, which is passed in an amplifier 5 similar to amplifier 6 for conversion into a bipolar signal SYN having a recurrence frequency of 1.024 MHz.

Moreover, a clock signal is generated from the master clock of the network and is passed in amplifier 4 for conversion into a bipolar signal RYT. Its frequency is therefore 20.480 MHz. The function of signals AIG and RYT will be explained in detail below.

Figure 3:
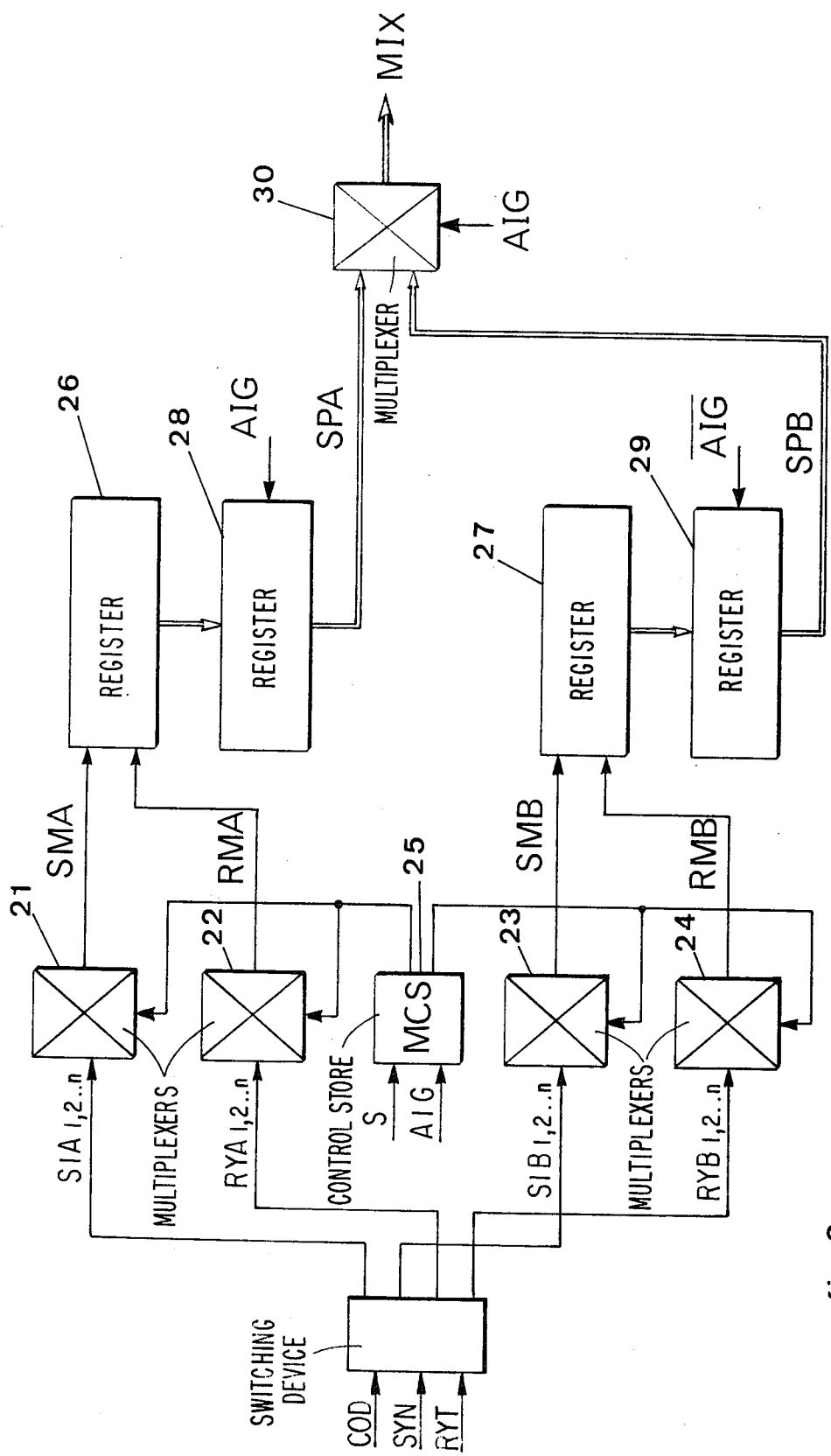
FIG. 3 is a block diagram of the reception device REC of FIG. 1.

Signals COD, RYT and SYN are transmitted on a transmission system $C_i$ comprising three lines, $i$ being the rank of the switching unit EMC to which belongs the MTE in question, and are fed to a respective reception-device REC 8 described hereinafter in reference to FIG. 3. It will be understood that the space stage comprises $p$ transmission system $C_i$ connected each to one MTE and to every MTS, and this has been evidenced in FIG. 1 by showing another system $C_j$.

There is shown in FIG. 2, on the one hand, the signals from amplifiers 4, 5 and 6, namely signals RYT, SYN and COD described above, and on the other hand the signals fed to the reception device REC 8, namely signals SIA, RYA and SIB, RYB. Signal SYN, due to its structure, makes it possible to distinguish two paths A and B, each conveying a message signal SI derived from signal COD and a timing signal RY derived from signal RYT. FIG. 2 shows that signal RYA is the equivalent in binary form of signal RYT when SYN is equal to 1 and is equal to 0 when SYN is 0, and likewise signal SIA is the equivalent in binary form of signal COD when SYN is 1 and is equal to 0 when the value of SYN is 0. Similarly, signals RYB and SIB are equivalent to signals RYT and COD when SYN is equal to 0, and are equal to 0 when SYN is equal to 1.

As a result the 10-digit words forming signals COD and RYT are alternatively distributed on paths A and B.

It can be ascertained from FIG. 2 that signals are received within reception ranges PA and PB determined by signal AIG. Reception range PA on path A begins with the leading edges of signal AIG and reception range PB on path B with the trailing edges. The duration of such a reception range is therefore equal to two time slots, or the duration of two words. It should be noted that the representation of FIG. 2 implies a zero transmission delay, however this is not significant since signals COD, RYT and SYN are transmitted on lines of the same length and remain in phase with respect to each other.

There is not shown the device which effects distribution on paths A and B. This device is merely a switching device having 3 inputs and 4 outputs, two for each path, signal SYN controlling the distribution on paths A and B. This device also carries out bipolar-to-binary conversion.

The reception device REC 8 will now be described with reference to FIG. 3.

Reception device 8 receives an information selected from among all those transmitted by the $p$ input buffer stores MTE. The selection is carried out by selection control store MCS 25 supplied with the address signal S' from the write control store MCE 9 shown in FIG. 1 and signal AIG. Signal AIG ensures that the address S' will be present in turn on path A and path B so as to provide for the above-mentioned reception ranges PA and PB.

Reception device 8 comprises input multiplexers 21, 22 (path A) and 23,24 (path B). For instance, multiplexer 21 receives all the signals SIA from the $p$ MTE and delivers a multiplexed signal SMA; likewise, multiplexer 22, 23, 24 derive signals RMA, SMB, RMB from signals RYA, SIB, RYB. The reception ranges determined by signal AIG thus define for each path the time during which one single word is received, two successive words of one channel being distributed on paths A and B.

Signals SMA and SMB are written in registers 26 and 27, respectively, in order to perform a serial-to-parallel conversion, the writing being carried out at the rate of signals RMA, RMB, respectively. A transfer of the content of registers 26 and 27 into registers 28 and 29 is controlled by signals AIG and $\overline{AIG}$, this transfer ensuring a re-phasing of the signals phase-shifted because of transmission delays. Provided that the transmission time is inferior to the duration of one word, the information is stable on register 26 at the occurrence of the rising edge of signal AIG on path A and on register 27 at the occurrence of the trailing edge of signal AIG (or the rising edge of signal $\overline{AIG}$). The outputs of registers 28 and 29 are therefore parallel signals SPA and SPB.

These signals SPA and SPB are then fed to a multiplexer 30 controlled by signal AIG in order to obtain signal MIX comprising words of 10 parallel binary digits at the rate of 2.048 MBits/s.

The overall time chart is shown in FIG. 4. The edges of signal AIG, for example determine the boundaries of the reception ranges PA of path A. The words $A_1$, $A_2$ and $A_3$ can have an undefined position in each corresponding range. This position depends on the propagation time between the selected MTE and the MTS. Within each of these ranges time intervals $E_1$, $E_2$ and $E_3$ are used for the serial writing of information into register 6. The transfer on path A is shown at TA. A signal SPA is available for path A and a signal SPB for path B, these signals being multiplexed into signal MIX formed by words of 10 parallel binary digits in phase with signal AIG.

In the described embodiment, the transmission duration of one word of 10 binary digits is 488 ns at a rate of 20.480 MBits/s.

$$t = 10/20,480,000 \approx 488 \text{ ns}$$

By construction, reception ranges of duration equal to two time slots are produced. Within these reception ranges the reception time of one word is equal to one time slot so that an operating margin of one time slot makes it possible to take account of the phase dispersion of the various signals AIG produced by the time bases BT distributed in the various switching units EMC and the propagation times in the spatial portion of the network. This operating margin is equivalent to that authorised in the case of a transmission in parallel of a word.

A duration of reception ranges PA and PB equal to two time slots is justified in the case where an operating margin equal to one time slot is sufficient to compensate for the different propagation times in the transmission lines and the various phase dispersions of the switching units EMC forming the network.

In cases where this margin is insufficient, it is possible to provide reception devices REC having more than two operating times by adapting the structure of signal AIG and consequently that of signal SYN. Under these conditions for a reception device operating according to $m$ times, the operating margin is $(m - 1)$ time slots.

The process according to the invention is of great interest in the production of large capacity networks, for example with a view to extending networks processing 512 TN1 connections.

What I claim is:

1. A time connection network of the kind comprising $p$ switching units having each an input buffer store and an output buffer store, and a space stage to transmit digital information in form of words or groups of $n$ binary digits from one input buffer store toward one output buffer store at a rate of one word per digit time slot, comprising means for serially transmitting the information signals read in an input buffer store, means for transmitting clock signals at the rate of said series transmission, means for generating a rectangular signal having a period of $m$ words, preferably of two words, means for distributing information signals and clock signals in two paths A and B, one path being gated by the leading edges of said rectangular signal and the other path by the trailing edges of the same signal, means for serial-to-parallel converting the information signals controlled by said clock signals, means for re-phasing the transmitted signals, controlled by said rectangular signal, serial-to-parallel conversion and re-phasing being carried out in each path, and means for multiplexing signals from paths A and B and transmitting them to an output buffer store.

* * * * *